ized Patent  [19]

Sandberg et al.

[11] Patent Number: 4,828,737
[45] Date of Patent: May 9, 1989

[54] AQUEOUS CONCENTRATED COOLING LUBRICANT FOR THE MECHANICAL WORKING OF ALUMINUM AND PROCESS

[75] Inventors: Elina Sandberg, Odsmal; Rolf Skold, Stenungsund, both of Sweden

[73] Assignee: Berol Suisse S.A., Fribourg, Switzerland

[21] Appl. No.: 50,175

[22] Filed: May 13, 1987

[51] Int. Cl.$^4$ .......................................... C10M 173/00
[52] U.S. Cl. .................................................. 252/49.3
[58] Field of Search ........................................ 252/49.3

[56] References Cited

U.S. PATENT DOCUMENTS

| | | | |
|---|---|---|---|
| 3,374,171 | 3/1968 | Davis | 252/49.3 |
| 4,243,537 | 1/1981 | Knepp et al. | 252/49.3 |
| 4,452,712 | 6/1984 | Laemmle | 252/49.3 |
| 4,636,321 | 1/1987 | Kipp et al. | 252/49.3 |

Primary Examiner—William R. Dixon, Jr.
Assistant Examiner—Jerry D. Johnson

[57] ABSTRACT

Aqueous concentrated cooling lubricants are provided in the form of a stable solution ready to use after dilution with water in processes for the mechanical working of aluminum and aluminum alloys, and containing as lubricating and corrosion inhibiting agents a combination of (a) a carboxylic acid $R_1COOH$, $R_1$ having from about seven to about twenty-two carbon atoms, (b) a tertiary alkylalkanolamine having a molecular weight of less than 300 and (c) a water-soluble organic solubilizer having a molecular weight of less than 400, and a hydrocarbon group of at most 6 carbon atoms, the amounts of the carboxylic acid and the alkanolamine being selected to provide a base/acid equivalent ratio of less than 0.9.

20 Claims, No Drawings

AQUEOUS CONCENTRATED COOLING LUBRICANT FOR THE MECHANICAL WORKING OF ALUMINUM AND PROCESS

Normally, kerosene-based cooling lubricants are used in the cold rolling of aluminum. However, kerosene-based cooling lubricants emit unacceptable quantities of hydrocarbons, pose a considerable fire hazard, and give a low cooling effect, which restrict production capacity.

Accordingly, replacement of kerosene-based cooling lubricants by water-based emulsions containing specific additives which reduce corrosion and/or the friction between the metal surface and the working tool, especially at high pressures, has been proposed, inter alia, by Knepp et al U.S. Pat. No. 4,243,537, patented Jan. 6, 1981 and EPO patent application No. 115,926, which contain as lubricating and corrosion inhibiting agents a mixture of alkanolamine and carboxylic acid.

Knepp et al point out that single phase aqueous lubricants have not been extensively used successfully in such applications as drawing, ironing, rolling, extrusion, and similar metal forming processes. However, it has been customary to use certain ingredients found in synthetic lubricants such as, for example, oleic acid in connection with a mineral oil. For example, Knepp U.S. Pat. No. 3,923,671, patented Dec. 2, 1975 discloses and claims a lubricant containing a fatty acid and mineral oil together with an aliphatic carboxylic acid ester and an emulsification agent. An emulsification agent is used to permit dispersion of the Knepp lubricant in water for use as a drawing and ironing lubricant in the can-making art.

Knepp et al point out it is also known to use alkanolamines and polyoxyalkylene glycols in aqueous lubricant compositions. For example, Davis U.S. Pat. No. 3,374,171, patented Mar. 19, 1968, discloses a cutting fluid comprising an alkanolamine, a polyoxyalkylene glycol and a saturated organic acid containing from 6 to 9 carbon atoms. David cautions, however, against the use of higher molecular weight saturated organic acids stating that the use of such higher organic acids can result in clogged filters, poor rust protection and reduced tool life in areas where hard water is encountered.

In fact, Davis describes that a balanced formulation can be obtained in a lubricant composition which is effective as a cutting fluid having improved corrosion-resistant lubricating and cooling efficiency properties and which, in the course of machining operations, maintains its transparency in hard water solutions, avoids the formation of tacky water-insoluble residues, is free from excessive foam formation and is resistant to rancidity.

The foregoing are in general, realized with aqueous compositions comprising a balanced formulation and containing as essential components a major proportion of water and, in individual minor proportions, the combination of a saturated organic acid, either straight-chain, or branched-chain having from about 6 to about 9 carbon atoms per molecule, a water-soluble alkanolamine and a water-soluble polyoxyalkylene glycol. In this respect, it is found that the alkanolamine component, in addition to functioning as a corrosion-inhibiting agent in which the aforementioned organic acids are soluble, also functions as a plasticizer in that, in the course of use, evaporation of water from the cutting fluid leaves a residue upon machinery parts which is desirably soft or semi-liquid. The function of the organic acid component in combination with the alkanolamine is primarily that of a corrosion inhibitor in that it forms the corresponding amine acid salt. The water-soluble polyoxyalkylene glycol in the novel composition functions as a load-support agent.

The water-soluble alkanolamine employed in the Davis formulation may be of any molecular weight but should, preferably, be liquid at room temperature. The lower molecular weight compounds are generally preferred and, for this purpose, it has been found that such alkanolamines as mono-, di- or triethanolamine are most effective. Other water-soluble alkanolamines may also be employed, and include such alkanolamines as isopropanolamines, e.g., mono-, di- and tri-isopropanolamine, dimethyl-ethanolamine, diethyl-ethanolamine, aminoethylethanolamine, N-acetyl ethanolamine, phenylethanolamine, phenyldiethanolamine and mixtures thereof.

The organic acid component, as previously indicated, comprises a saturated organic acid, either straight-chain or branched-chain having from about 6 to about 9 carbon atoms per molecule, or mixtures thereof. In this respect, it has been found that the relatively lower molecular weight acids having from about 1 to about 5 carbon atoms per molecule do not satisfactorily function as rust inhibitors and are also objectionable because of their strong odor. On the other hand, it is found that by employing relatively high molecular weight saturated organic acids, i.e., acids having more than about 9 carbon atoms per molecule, there results poor hard water stability, reduced corrosion inhibiting properties and high foaming tendencies. Of particular utility with respect to the aforementioned saturated intermediate molecular weight organic acids in the present improved formulation are hexanoic, heptanoic, caprylic and pelargonic acids.

In combination with the aforementioned water-soluble alkanolamines and saturated organic acids is the use of the water-soluble polyoxyalkylene glycols as load-support agents. Preferred compounds of this type include water-soluble oils obtained by copolymerizing mixtures of ethylene oxide and propylene oxide, e.g., oils prepared by copolymerizing a 50—50 mixture of ethylene oxide and propylene oxide; water-soluble heteric copolymeric alkylene glycols, ethers or esters thereof, wherein the different oxyalkylene units are substantially, randomly distributed throughout the entire polyoxyalkylene chain; water-soluble polyoxyalkylene compounds containing hydrophobic homopolyoxyalkylene units; and polymeric agents, in general, which are block copolymers of cogeneric mixtures of conjugated polyoxyalkylene compounds containing at least one hydrophobic homopolyoxyalkylene unit, having a unit weight of at least about 800, and one or two other hydrophilic polymeric units which comprise from about 15 percent to about 90 percent of the total polymeric compound. The most desirable water-soluble polyoxyalkylene glycols for use in the formulations of the Davis invention comprise the polyether polyols produced by reacting ethylene oxide and propylene oxide having hydroxyl numbers from about 22 to about 38. If so desired, in order to impart increased anti-rust properties to the aqueous lubricant composition, an alkali metal nitrite may also be employed in the novel formulation. In this respect, it is found that more specific increased resistance to copper corrosion may also be obtained by the additional use of the sodium salt of mercapto-benzothiazole or benzotriazole.

The Davis lubricant compositions are formulated in accordance with certain balanced proportions expressed in weight percent. Thus, with water being present in a major proportion in each instance, the alkanolamine is employed in an amount from about 5 to about 40 percent, and preferably in an amount from about 20 to about 35 percent, by weight. The organic acid component is employed in an amount from about 0.1 to about 9 percent, and preferably in an amount from about 1 to about 4 percent, by weight. The polyoxyalkylene glycol is employed in an amount from about 0.5 to about 20 percent, and preferably in an amount from about 0.5 to about 5 percent, by weight. If so desired, other additives for enhancing rust protection or for the purpose of raising the pH of the system may be employed. Such additional additives may include boric acid or oxides of boron for enhancing rust protection, and are generally employed in an amount from about 0.1 to about 5 percent, and preferably from about 0.1 to about 3 percent, by weight. For raising the pH of the system, such additional additives may be employed in the form of alkali metal hydroxides, including, more specifically, sodium, lithium or potassium hydroxide. When the latter are present, they are generally employed in an amount from about 0.1 to about 3 percent, and preferably from about 0.1 to about 1.5 percent, by weight. Furthermore, if so desired, various water-soluble chelating agents may be employed to soften the water vehicle. These may include, for example, salts of ethylenediamine tetraacetic acid, nitrilo-triacetic acid or diethylene triamine pentaacetic acid. When any of the aforementioned chelating agents are employed, they are generally present in an amount from about 0.1 to about 5 percent, by weight. In each instance, of course, it will be apparent that sufficient water is employed in order to balance the formulation.

Davis does not disclose that these compositions can be used in the mechanical working of aluminum. The alkanolamine forms the alkanolamine salt of the organic acid, which functions as a corrosion inhibitor, as a result, and so, to function as a plasticizer for the residues that form, has to be used in amounts in excess of the base equivalent of the acid (which is consumed in the salt formation), to provide free alkanolamine. Since the alkanolamine is alkaline, the composition is alkaline, and is made more so by addition of alkali such as NaOH. The Davis compositions are therefore unsuitable for mechanical working of aluminum.

Knepp et al U.S. Pat. No. 4,243,537 discovered that a synthetic lubricant having good lubricating properties in the fabrication of aluminum metal, particularly in the drawing and ironing of aluminum cans, can be obtained using an alkanolamine, a water-dispersible or miscible polyoxyalkylene alcohol and an aliphatic acid containing from 12 to 18 carbon atoms. A carboxylic acid ester or diester may also be used with the other ingredients. This combination of ingredients disperses or mixes in water to form a lubricant which has very low extractability in hexane. In a preferred embodiment, an aliphatic carboxylic acid ester is also added.

The alkanolamine may be a mono-, di-, or trialkanolamine wherein the alkanol moiety may have 2 to 4 carbon atoms such as ethanol, propanol, or butanol, e.g. triethanolamine.

The aliphatic acid containing from 12 to 18 carbon atoms may include both saturated, unsaturated, and branched chain acids and mixtures thereof. Suitable saturated and unsaturated acids include: lauric acid, myristic acid, palmitic acid, stearic acid, oleic acid, isostearic acid, linolenic acid, ricinoleic acid, etc. Preferably, the acid contains at least 16 carbon atoms.

The polyoxyalkylene alcohol is a water-dispersing or miscible ether alcohol which is the reaction product of an alcohol or phenol with alkylene oxides. The alcohol has the formula R—OH wherein R may be a 1 to 6 carbon alkyl or an aryl, including a substituted aryl. The polyether or polyalkylene oxide portion may comprise a polymer or ethylene oxide, propylene oxide, butylene oxide, or copolymers of combinations of any two or all three of the above. The alkylene oxide units in the ether may be from 2 to 20 in number.

An optional additional ingredient is an aliphatic carboxylic acid ester or diester comprising the esterified product of monocarboxylic acids having at least 4 carbon atoms with monoalcohols or polyhydrics including polyhydric polyether alcohols. The acids which have been esterified with the alcohol may comprise only one acid or may be a mixture of acids. An example of such an ester is triethylene glycol caprate-caprylate.

In accordance with the Knepp invention, the alkanolamine should comprise from 5 to 15 parts by weight of the entire lubricant. The aliphatic acid should also comprise 5 to 15 parts by weight of the lubricant. The polyoxyalkylene alcohol should comprise from 15 to 55 parts by weight of the lubricant. The aliphatic carboxylic acid ester comprises from 0 to 20 parts by weight and the balance of the lubricant comprises water, i.e., from 15 to 40 parts. The foregoing ratios provide the "neat" lubricant which then is further diluted with water in actual use to the extent of from 20% by weight neat lubricant down to as little as 2% neat lubricant. The purpose of the water in the neat lubricant formulation is to provide compatibility of the constituents into a single phase concentrate.

The ready-to-use lubricant compositions of the Examples of U.S. Pat. No. 4,243,537 thus are aqueous emulsions, which are not stable, and separate into two phases unless stirred. In addition, mono, di and trialkanolamines with 2 to 4 carbon alkanol groups give rise to annealing deposits that cause surface straining of aluminum. The compositions of EPO No. 115,926 also are unstable aqueous emulsions.

These two-phase aqueous lubricants are not satisfactory, and have not been accepted commercially. Their tendency to separate into two phases impairs their effectiveness. Their content of lubricating and corrosion inhibiting agents is so low they give poor lubrication. Because they settle out as two phases, they deposit materials that cause stains on the metal surfaces, which in the case of Knepp are more severe because of the presence of alkanolamine.

The two phase aqueous systems give rise to water-staining, so-called white rust, of the aluminum surfaces, which is evidence of corrosion, showing that the components of the cooling lubricant provide insufficient corrosion protection for aluminum. While lubrication and corrosion protection are improved by increasing the amount of lubricant and corrosion inhibitor, at such high amounts there is obtained during the subsequent heat treatment an unacceptable staining of the aluminum surface, the residues of the components of the cooling lubricant, which are converted and burned into the aluminum surfaces.

Another problem is that roll marks and other physical damage to the rolled aluminum surface may occur because metal is torn from the billet which is being rolled, and is welded to the rolls. The resulting irregularities during further rolling may damage the aluminum surface.

In accordance with the invention these difficulties are overcome by a careful reformulation of the aqueous systems heretofore available so that the composition is in the form of an aqueous solution that is stable, at least at a temperature within the range from about 20 to about 70° C, of relatively low alkalinity, with a pH below 9 and even as low as 6, by redistributing the proportion of acid (carboxylic acid) to base (tertiary alkylalkanolamine) to provide a base/acid equivalent ratio of less than 1. Such aqueous solutions make it possible to effect cold or hot rolling of aluminum or aluminum alloys with satisfactory lubrication and low corrosion, without staining of the metal surface during subsequent heat treatment.

The stable aqueous cooling lubricant solutions consist essentially of:

(a) a carboxylic acid having the formula $R_1COOH$, in which $R_1$ is a hydrophobic group having from about seven to about twenty-two carbon atoms selected from the group consisting of aliphatic hydrocarbon and aliphatic hydrocarbon including a group selected from ether, thioether, ester, hydroxyl, carboxyl, and amide;

(b) a tertiary alkylalkanolamine having a molecular weight of less than 300 and the formula

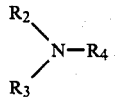

in which $R_2$ is selected from the group consisting of alkanol having from one to about four carbon atoms and at least one hydroxyl group up to about three hydroxyl groups; and $(A)_nH$, wherein A is an oxyalkylene group having from two to about four carbon atoms; n is a number (which can be an average number) from 1 to 3;

$R_3$ is an alkyl group having from one to about six carbon atoms; and $R_4$ is selected from the group consisting of $R_2$ and $R_3$; and (c) a water-soluble aliphatic alcohol, ether or mixed alcohol ether having a molecular weight of less than 400 and a hydrocarbon group having from one to about six carbon atoms, (referred to hereinafter as alcohol/ether) in an amount to form a stable aqueous solution of (a), (b) and (c);

the amounts of tertiary alkylalkanolamine and carboxylic acid being selected to provide a base/acid equivalent ratio of less than 1, on the acid side of the isoelectric point.

By "stable solution" is meant a solution which does not separate into two or more phases for at least one month.

The tertiary alkylalkanolamines differ remarkably from tertiary alkanolamines in that they do not cause staining of the aluminum surface.

It is essential that the base/acid equivalent ratio be less than 1 and preferably within the range from about 0.5 to about 0.9. That is, the equivalent amount of alkylalkanolamine is less than the equivalent amount of acid. At a base/acid equivalent ratio of 1, the cooling lubricant normally has a pH below 8.5. In air the aluminum surface is oxidized and such a surface usually has an isoelectric point at a pH-value of about 8.5 to 9. The compositions of the invention are so formulated that the process of mechanically working the aluminum can be carried out on the acid side of the isoelectric point, and preferably at a pH of from about 6 to about 8.

Practical tests have shown that it is of great importance in avoiding physical damage to the rolled surfaces during rolling that the cooling lubricant be in the form of a stable solution, and not as an emulsion. It is thought the kinetics in the stable solution according to the invention are promoted such that the metal surfaces quickly are covered with a homogeneous adsorbed protective layer of the carboxylic acid and tertiary alkylalkanolamine, which counteracts the formation of local deposits of additives, which, during the subsequent heat treatment, may cause staining, as well as physical damage.

A further advantage of the cooling lubricant solution according to the invention is that it is easy to filter, in order to remove impurities formed during working. The cooling lubricant may be reused after filtration without any appreciable risk of soiling, metal-catalyzed oxidative degradation, or microbial degradation.

No active ingredients other than the carboxylic acid (a), the tertiary alkylalkanolamine (b), the alcohol/ether (c) and water are essential.

In addition to the carboxylic acid (a), tertiary alkylalkanolamine (b), alcohol/ether (c), and water, the cooling lubricant may contain (d) a polar, predominantly hydrophobic, nonionic compound in an amount to further improve lubrication.

The hydrophobic group $R_1$ having from about seven to about twenty-two carbon atoms of the carboxylic acid $R_1COOH$ is preferably a straight chain saturated aliphatic group, but can also be a branched chain and/or unsaturated aliphatic group. Especially preferred groups are alkyl groups having from seven to about seventeen carbon atoms. Specific examples of suitable carboxylic acids are heptanoic acid, caprylic acid, pelargonic (nonanoic) acid, capric (decanoic) acid, undecylic acid, lauric acid, tridecanoic acid, myristic acid, palmitic acid, stearic acid, arachidic acid, behenic acid, lignoceric acid, as well as unsaturated fatty acids such as oleic acid, linoleic acid, linolenic acid, ricinoleic acid and mixtures thereof, including the mixed fatty acids derived from oils and fats, such as coconut oil fatty acids, as well as mixtures thereof.

The aliphatic group $R_1$ may also contain hetero atoms, such as oxygen, sulphur and nitrogen, which can be included in such functional groups as ether, thioether, ester, hydroxyl, carboxyl, and amide groups. Examples of such carboxylic acids include:

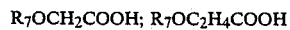

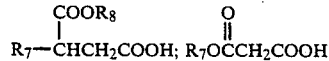

wherein $R_8$ is alkyl having from one to four carbon atoms or hydrogen, and $R_7$ is a hydrocarbon group, preferably an aliphatic hydrocarbon group, having from five to twenty carbon atoms, $R_7$ and $R_8$ being selected such that the meaning of $R_1$ is satisfied.

Exemplary $R_2$ alkanol groups of the tertiary alkylalkanolamine include hydroxymethyl, hydroxy ethyl, hydroxy propyl, hydroxy isopropyl, hydroxy butyl, hydroxy isobutyl, hydroxy tertiary butyl, dihydroxy phenyl, dihydroxy isopropyl, dihydroxy butyl, dihydroxy isobutyl, and trihydroxy butyl.

Exemplary $R_3$ alkyl include methyl, ethyl, propyl, isopropyl, butyl, isobutyl, sec-butyl, tert-butyl, amyl, isoamyl, sec-amyl, tert-amyl, hexyl, isohexyl, tert-hexyl and sec-hexyl.

Examples of suitable tertiary alkylalkanolamines are diethanol ethyl amine, diethanol propyl amine, diethanol butyl amine, diethanol pentyl amine, diethanol hexyl amine and the corresponding dipropanol amines, and ethanol diethyl amine, ethanol dipropyl amine, ethanol dibutyl amine and the corresponding propanol amines, and such alkanolamines containing $(A)_nH$ produced by alkoxylation with ethylene oxide and/or propylene oxide and/or butylene oxide.

The amount of the carboxylic acid and the alkylalkanolamine is selected to provide a base/acid equivalent ratio within the range from 0.5 to 1, preferably 0.5 to 0.9, which results in a cooling lubricant having a pH within the range from about 6 to about 8. The higher the proportion of carboxylic acid to alkylalkanolamine, the better the lubricating effect. If good lubrication is a prerequisite, it is advisable to select a base/acid equivalent ratio of from 0.5 up to 0.9.

The water-soluble low-molecular weight alcohol, ether or mixed alcohol ether (referred to generically herein as "alcohol/ether") is an aliphatic compound that contains hydroxyl groups and/or ether groups. Examples of such compounds are ethylene glycol and propylene glycol ethers of ethylene glycol and propylene glycol, diethylene glycol, triethylene glycol, dipropylene gylcol, tripropylene glycol, such as mono- and dibutyl ethylene glycol, mono- and dipropyl ethylene glycol, mono- and diethyl ethylene glycol, mono- and dibutyl propylene glycol, mono- and dipropyl propylene glycol, mono- and diethyl propylene glycol, and the corresponding mono- and diethers of diethylene glycol, triethylene glycol, dipropylene glycol, and tripropylene glycol, as well as alcohols such as pentanol, isopentanol, isobutanol, butanol, propanol, and isopropanol. Monoethers of mono- and diethylene glycol are preferred.

In addition to the alkylalkanolamine, carboxylic acid, alcohol/ether, and water, which are the essential ingredients, the compositions of the invention optionally but preferably also include a nonionic compound (d). The nonionic compound (d) primarily contributes to the lubricating effect of the cooling lubricant, and must be predominantly hydrophobic in character. By this is meant that it should have a HLB value of less than 10, preferably less than 9. The preferred nonionic compounds are relatively insoluble in water, but dissolve in the aqueous solution of (a), (b) and (c).

The nonionic compound (d) can be selected from aliphatic nonionic compounds; aromatic nonionic compounds; and mixed aliphatic aromatic nonionic compounds. The aliphatic compounds are preferred.

Suitable nonionic compounds (d) have the formula $R_5(B)_mOR_6$, wherein $R_5$ is a hydrocarbon or acyl group having from about eight to about twenty-four carbon atoms, B represents an oxyalkylene group having from two to four carbon atoms, $R_6$ is hydrogen, or an alkyl or acyl group having from one to four carbon atoms, and m is a number (which can be an average number) from 0 to 4.

Examples of preferred nonionic compounds of this formula, where $R_6$ is H, are water-insoluble alcohols, such as octanol, decanol, dodecanol, tetradecanol, hexadecanol, and octadecanol; oxo alcohols having from nine to seventeen carbon atoms; phenols such as nonyl phenol, octyl phenol, and dodecyl phenol, as well as ethoxylates of the above mentioned alcohols and phenols with from 1 to 4 moles of ethylene oxide per mole of alcohol or phenol. These compounds are defined by the general formula $R_5(B)_mOH$, where $R_5$, B and m have the meanings indicated above.

Other examples of nonionic compounds are fatty acid esters which are alkoxylated or esterified with the compound $H(B)_mOR_6$, wherein B, $R_6$, and m have the meaning indicated above. Specific examples of this type are $C_{11}H_{21}COOC_2H_4OH$; $C_{11}H_{23}COOCH_3$; $C_9H_{19}CO(OC_2H_4)_2OCH_3$.

Preferred esters are those having the general formula $R_5OR_6$, wherein $R_5$ is an acyl group having from eight to twenty-four carbon atoms, and $R_6$ is an alkyl group having from one to four carbon atoms.

Examples of compounds of the above formula where B is an oxyalkylene group and m is 1 to 4 are polymers based on ethylene oxide and higher alkylene oxides. The alkylene oxide units may be both random-coupled and coupled in blocks.

In addition to the above mentioned components (a), (b), (c) and (d), the aqueous cooling lubricant solutions according to the invention may also contain conventional additives that are soluble therein, such as bactericidal agents, antifoam additives, viscosity controlling agents, perfumes, and additional agents capable of supplementing lubrication and corrosion protection.

The cooling lubricants according to the invention, can be in the form of a concentrate solution that upon dilution with water forms a ready-to-use aqueous cooling lubricant solution. Such concentrates contain the following components:

| Component | Proportion (% by Weight) Overall | Preferred |
| --- | --- | --- |
| Carboxylic acid | 15 to 75 | 20 to 45 |
| Tertiary alkylalkanolamine | 3 to 60 | 10 to 45 |
| Alcohol/ether | 10 to 87 | 10 to 68 |
| Nonionic compound | 0 to 30 | 2 to 30 |
| Additives: | | |
| bactericidal agents, perfumes, viscosity controlling agents etc. | 0 to 30 | 0 to 15 |
| Water | 0 to 82 | 0 to 58 |

After diluting the concentrate with water, a cooling lubricant solution is obtained which is ready for use. The ready-to-use compositions have the following formulation:

| Component | Proportion (% by Weight) Overall | Preferred |
| --- | --- | --- |
| Carboxylic acid | 0.5 to 25 | 2 to 15 |
| Tertiary alkylalkanolamine | 0.1 to 20 | 1 to 15 |
| Alcohol/ether | 0.5 to 33 | 1 to 18 |
| Nonionic compound | 0 to 10 | 0.1 to 2 |
| Additives: | | |
| bactericidal agents, perfumes, viscosity controlling agents | 0 to 5 | 0.1 to 2 |

-continued

| Component | Proportion (% by Weight) Overall | Preferred |
|---|---|---|
| Water | 25 to 99.4 | 40 to 96.7 |

The ready-to-use cooling lubricant solution preferably has a water content within the range from 70 to 95% by weight.

The following Examples represent preferred embodiments of concentrates according to the invention.

Examples 1 to 19.

The following cooling lubricant concentrates according to the invention were prepared. All were stable concentrate solutions at 20° C.

TABLE I

| Example | Formulation | Parts by Weight |
|---|---|---|
| 1 | Lauric acid | 3.2 |
|  | $C_4H_9N(C_2H_4OH)_2$ | 1.5 |
|  | $C_{14}H_{29}O(C_2H_4O)_2H$ | 0.7 |
|  | Butyl diethylene glycol | 9.0 |
|  | Base/acid equivalent ratio | 0.58 |
| 2 | Pelargonic acid | 6.0 |
|  | $C_4H_9N(C_2H_4OH)_2$ | 3.5 |
|  | $C_{12-14}H_{25-29}O(C_2H_4O)_2H$ | 1.5 |
|  | Butyl diethylene glycol | 3.6 |
|  | Base/acid equivalent ratio | 0.57 |
| 3 | Lauric acid | 6.0 |
|  | $C_4H_9N(C_2H_4OH)_2$ | 3.4 |
|  | $C_{12-14}H_{25-29}O(C_2H_4O)_2H$ | 1.5 |
|  | Butyl diethylene glycol | 4.4 |
|  | Base/acid equivalent ratio | 0.70 |
| 4 | Lauric acid | 6.0 |
|  | $C_4H_9N(C_2H_4OH)_2$ | 3.9 |
|  | $C_{12-14}H_{25-29}O(C_2H_4O)_2H$ | 1.5 |
|  | Butyl diethylene glycol | 2.7 |
|  | Base/acid equivalent ratio | 0.81 |
| 5 | Lauric acid | 8.0 |
|  | $C_4H_9N(C_2H_4OH)_2$ | 4.5 |
|  | $C_{12-14}H_{25-29}O(C_2H_4O)_2H$ | 1.3 |
|  | Butyl diethylene glycol | 6.7 |
|  | Base/acid equivalent ratio | 0.70 |
| 6 | Lauric acid | 6.7 |
|  | $C_4H_9N(C_2H_4OH)_2$ | 3.8 |
|  | $C_{12-14}H_{25-29}OH$ | 1.7 |
|  | Butyl diethylene glycol | 7.8 |
|  | Base/acid equivalent ratio | 0.70 |
| 7 | Lauric acid | 6.7 |
|  | $C_4H_9N(C_2H_4OH)_2$ | 3.7 |
|  | $C_{11}H_{23}COOCH_3$ | 1.7 |
|  | Butyl diethylene glycol | 8.0 |
|  | Base/acid equivalent ratio | 0.69 |
| 8 | $C_{11}H_{23}COOH$ (branched) | 6.0 |
|  | $C_4H_9N(C_2H_4OH)_2$ | 3.0 |
|  | $C_{12}H_{25}O(C_2H_4O)_2H$ | 1.0 |
|  | Butyl diethylene glycol | 5.9 |
|  | Base/acid equivalent ratio | 0.62 |
| 9 | Lauric acid | 6.0 |
|  | $C_4H_9N(C_2H_4OH)_2$ | 3.4 |
|  | $C_{14}H_{29}O(C_2H_4OH)_2$ | 1.0 |
|  | Butyl diethylene glycol | 3.8 |
|  | Base/acid equivalent ratio | 0.70 |
| 10 | Lauric acid | 6.7 |
|  | Diethylene ethanol amine + EO | 3.8 |
|  | $C_{12-14}H_{25-29}OH$ | 1.4 |
|  | Butyl diethylene glycol | 8.2 |
|  | Base/acid equivalent ratio | 0.70 |
| 11 | Lauric acid | 4.0 |
|  | Butyl diethanol amine | 2.7 |
|  | Methyl laurate | 1.0 |
|  | Butyl diethylene glycol | 4.8 |
|  | Base/acid equivalent ratio | 0.84 |
| 12 | Lauric acid | 6.9 |
|  | Butyl diethanol amine | 3.9 |
|  | $C_{12-14}H_{25-29}OH$ | 1.4 |
|  | Pentyl diethylene glycol | 7.9 |
|  | Base/acid equivalent ratio | 0.70 |

TABLE I-continued

| Example | Formulation | Parts by Weight |
|---|---|---|
| 13 | Pelargonic acid | 7.4 |
|  | $C_{12-14}H_{25-29}OH$ | 0.9 |
|  | 2,2-Dimethylamino methyl propanol | 3.6 |
|  | Butyl diethylene glycol | 5.0 |
|  | Base/acid equivalent ratio | 0.67 |
| 14 | Lauric acid | 6.2 |
|  | 2,2-Dimethylamino methyl propanol | 2.5 |
|  | Butyl diethylene glycol | 7.1 |
|  | $C_{12-14}H_{25-29}OH$ | 1.2 |
|  | Base/acid equivalent ratio | 0.69 |
| 15 | Lauric acid | 8.21 |
|  | $C_4H_9N(C_2H_4OH)_2$ | 5.12 |
|  | Butyl diethylene glycol | 6.67 |
|  | Base/acid equivalent ratio | 0.77 |
| 16 | Lauric acid | 5.69 |
|  | $C_4H_9N(C_2H_4OH)_2$ | 3.55 |
|  | Butyl diethylene glycol | 4.63 |
|  | $C_{12-14}H_{25-29}OH$ | 1.13 |
|  | Base/acid equivalent ratio | 0.78 |
| 17 | Pelargonic acid | 8.62 |
|  | $C_4H_9N(C_2H_4OH)_2$ | 6.38 |
|  | Butyl diethylene glycol | 3.00 |
|  | Base/acid equivalent ratio | 0.71 |
| 18 | Lauric acid | 9.0 |
|  | $C_4H_9N(C_2H_4OH)_2$ | 6.0 |
|  | Butyl diethylene glycol | 3.0 |
|  | Base/acid equivalent ratio | 0.79 |
| 19 | Decanoic acid | 8.6 |
|  | 2,2-Dimethylamino methyl propanol | 3.6 |
|  | Butyl diethylene glycol | 7.0 |
|  | Base/acid equivalent ratio | 0.61 |
| 20 | Decanoic acid | 11.26 |
|  | 2,2-Dimethylamino methyl propanol | 5.36 |
|  | Base/acid equivalent ratio | 0.70 |

The above lubricant concentrates are stable solutions that are diluted with from 25 to 75 parts of water to form ready-to-use cooling lubricant solutions in accordance with the invention.

For comparison, the following cooling lubricants were prepared. All were in the form of aqueous emulsions over the entire temperature range of 20 to 70° C. The cooling lubricants in accordance with U.S. Pat. No. 4,243,537 are Controls A, B and C, while cooling lubricants formulated in accordance with EPO Patent Application No. 115,926 are Controls D and E.

TABLE II

| Control | Formulation | Percent by Weight |
|---|---|---|
| A | Oleic acid | 2 |
|  | Triethanol amine | 1 |
|  | Polyalkylene glycol (UCON 5HB 100) | 10 |
|  | Water | balance |
|  | Base/acid equivalent ratio | 0.95 |
|  | pH |  |
| B | Oleic acid | 2 |
|  | Triethanol amine | 1 |
|  | Polyalkylene glycol (UCON 5HB 100) | 10 |
|  | $\underset{\|}{O} \quad \underset{\|}{O}$ $C_9H_{19}CO(C_2H_4O)_3CC_7H_{15}$ | 3 |
|  | Water | balance |
|  | Base/acid equivalent ratio | 0.95 |
|  | pH |  |
| C | Oleic acid | 2.0 |
|  | Triethanol amine | 1.6 |
|  | Polyalkylene glycol (UCON 5HB 100) | 10 |
|  | Water | balance |

TABLE II-continued

| Control | Formulation | Percent by Weight |
|---|---|---|
|  | Base/acid equivalent ratio pH | 1.5 |
| D | Lauric acid | 1.5 |
|  | Diethanol amine | 1.5 |
|  | Polyalkylene glycol (Pluronic 17R2) | 10 |
|  | $C_9H_{19}CO(C_2H_4O)_3CC_7H_{15}$ (with two C=O) | 1.0 |
|  | Water | balance |
|  | Base/acid equivalent ratio pH | 1.9 |
| E | Oleic acid | 1.0 |
|  | Triethanol amine | 0.8 |
|  | Polyalkylene glycol (Pluronic 17R2) | 5.0 |
|  | Water | balance |
|  | Base/acid equivalent ratio pH | 1.5 |

All of the above lubricant concentrates of Examples 1 to 19 were diluted with water to form ready-to-use cooling lubricants in which the total water was the balance computing the remaining ingredients as % by weight, instead of the parts by weight in Examples 1 to 19.

Cold rolling of annealed aluminum sheet of grade AA3004 was carried out using these cooling lubricants and the Controls in a single stand with rolls having a diameter of 159 mm. During rolling, the sheet thickness was reduced from 1.05 mm to 0.63 mm. The requisite rolling force was determined as the pressure in the hydraulic system transferring the compressive force to the rolls. After rolling, the surfaces were judged visually with respect to physical damage on a scale from 0 to 1. The value 0 designates a surface which is up to standard, i.e. a surface essentially free from physical damage, while 1 designates a surface not up to standard, i.e. a surface with visible physical damage.

The rolled aluminum sheets were wiped clean and supplied with cooling lubricant in abundance, whereupon another sheet was placed on top and both sheets were heated to 360° C. for five hours in air. The appearance after heating was judged visually with respect to color, i.e., the degree of blackening, on a scale from 0 to 4, and the proportion of stained surface as % of the whole surface area.

| Scale | Color | Stained surface, % |
|---|---|---|
| 0 | Perfect no color | 0 |
| 1 | Discernible color | 1–15 |
| 2 | Slight color | 6–15 |
| 3 | Distinct color | 16–50 |
| 4 | Strong color | 51–100 |

The color and stained surface were summed up as a total assessment designated "annealing residues" on a scale of from 0 to 8, in which 0 to 1 is excellent, 2 to 3 well up to standard, 4 to 5 just up to standard, and 6 to 8 below standard. By "just up to standard" is meant that the aluminum sheets would be just commercially acceptable.

In order to determine the corrosive effect of the cooling lubricant upon iron, cast-iron chips were placed on a filter paper that had been soaked with a specific amount of the cooling lubricant and left for 24 hours. Then a grid having 126 intersections over an area of 150 cm$^2$ was placed over the filter paper, and the occurrence of corrosion was determined for each point of intersection on the grid. The iron corrosion was then expressed as the number of intersecting points with rust in relation to the total number of intersecting points.

White rust was determined by coating aluminum sheets with the cooling lubricant, and then stacking the sheets and cooling them for 1 hour at −20° C., whereupon they were exposed for 2 hours to humid air of room temperature. After that, the sheets were heated to 80° C. for 10 hours. The white rust was then assessed in the same manner as the iron corrosion.

The following results were obtained:

TABLE III

| Example No. | Force kN | Annealing residues | Iron corrosion | White rust % | Physical appearance |
|---|---|---|---|---|---|
| Control |  |  |  |  |  |
| A | 13.3 | 5 | 5 | 20 | 1 |
| B | 13.5 | 8 | 4 | 6 | 1 |
| C | 14.0 | 8 | 0.1 | 12 | 1 |
| D | 16.5 | 5 | 0 | 0 | 1 |
| E | 14.5 | 5 | 4 | 30 | 1 |
| Example |  |  |  |  |  |
| 1 | 14.7 | 1 | 1 | 0 | 0 |
| 2 | 14.3 | 2 | 0 | 0 | 0 |
| 3 | 14.3 | 3 | 0 | 0 | 0 |
| 4 | 14.4 | 2 | 0 | 0 | 0 |
| 5 | 13.2 | 3 | 0 | 0 | 0 |
| 6 | 13.4 | 3 | 0 | 0 | 0 |
| 7 | 13.5 | 2 | 0 | 0 | 0 |
| 8 | 14.0 | 3 | 0 | 0 | 0 |
| 9 | 13.4 | 2 | 0 | 0 | 0 |
| 10 | 13.5 | 3 | 0 | 1 | 0 |
| 11 | 12.5 | 2 | 0 | 5 | 0 |
| 12 | 13.0 | 3 | 0 | 4 | 0 |
| 13 | 14.5 | 1 | 0 | 0 | 0 |
| 14 | 14.5 | 1 | 0 | 0 | 0 |
| 15 | 13.1 | 3 | 0 | 0 | 0 |
| 16 | 13.5 | 2 | 0 | 0 | 0 |
| 17 | 13.2 | 2 | 0 | 0 | 0 |
| 18 | 13.2 | 2 | 0 | 0 | 0 |
| 19 | 13.0 | 1 | 0 | 0 | 0 |
| 20 | 13.0 | 3 | 0 | 0 | 0 |

As is evident from these results, the cooling lubricants according to the invention provide, as compared with the prior art Controls A to E, rolled aluminum surfaces having a far better physical appearance. Iron corrosion and white rust both are maintained at a very low level, which is essentially lower than for the controls. In addition, the cooling lubricants according to the invention give a low level of annealing residues, which in all cases are essentially lower than the controls.

Having regard to the foregoing disclosure, the following is claimed as the inventive and patentable embodiments thereof:

1. An aqueous stable cooling lubricant solution that does not separate into two phases at a temperature within the range from 20 to 70° C., over a period of at least one month for use in the mechanical working of aluminum and aluminum alloys, that gives satisfactory lubrication and low corrosion without unacceptable staining of the aluminum surface during subsequent heat treatment, and consisting essentially of
   (a) a carboxylic acid having the formula $R_1COOH$, in which $R_1$ is a hydrophobic group having from about seven to about sixteen carbon atoms selected from the group consisting of aliphatic hydrocarbon and aliphatic hydrocarbon including a group selected from ether, thioether, ester, hydroxyl, carboxyl, and amide and (b) a tertiary alkylalkanolamine having a molecular weight of less than 300 and the formula

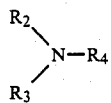

in which:

R₂ is selected from the group consisting of alkanol having from one to about four carbon atoms and at least one hydroxyl group up to about three hydroxyl groups; and (A) n H, wherein A is an oxyalkylene group having from two to four carbon atoms; n is a number (which can be an average number) from 1 to 3;

R₃ is an alkyl group having from one to about six carbon atoms; and

R₄ is selected from the group consisting of R₂ and R₃; and (c) a water-soluble aliphatic alcohol, ether or mixed alcohol ether having a molecular weight of less than 400 and a hydrocarbon group having from one to about six carbon atoms, in an amount to form a stable aqueous solution of (a), (b) and (c); the carboxylic acid and tertiary alkylalkanolamine being in amounts selected to give a base/acid equivalent ratio of less than 1 and a pH of less than 9, on the acid side of the isoelectric point; and (d) water; the carboxylic acid (a), the tertiary alkyl alkanolamine (b), and the water soluble aliphatic alcohol, ether or mixed alcohol-ether (c) and their amounts being so selected as to give a stable aqueous solution when water is present in a selected working concentration of water within the range from about 25 to about 99.4%.

2. An aqueous stable cooling lubricant solution according to claim 1 in which the base/acid equivalent ratio is within the range from about 0.5 to about 0.9.

3. An aqueous stable cooling lubricant solution according to claim 1 in which R₁ of the carboxylic acid R₁COOH is a straight chain saturated aliphatic hydrocarbon group having from about seven to about seventeen carbon atoms.

4. An aqueous stable cooling lubricant solution according to claim 1, in which the carboxylic acid R₁COOH is selected from the group consisting of

R₇OCH₂COOH; R₇OC₂H₄COOH

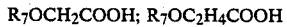

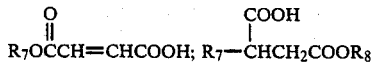

wherein R₈ is alkyl having from one to about four carbon atoms or hydrogen, and R₇ is a hydrocarbon group, preferably an aliphatic hydrocarbon group, having from five to twenty carbon atoms, R₇ and R₈ being selected such that the total number of carbon atoms in R₁ is within the range stated.

5. An aqueous stable cooling lubricant solution according to claim 1, in which the alcohol/ether is a water-soluble low-molecular weight aliphatic alcohol.

6. An aqueous stable cooling lubricant solution according to claim 1, in which the alcohol/ether is a water-soluble low-molecular weight aliphatic alcohol ether.

7. An aqueous stable cooling lubricant solution according to claim 1, in which the alcohol/ether is a water-soluble low-molecular weight aliphatic ether.

8. An aqueous stable cooling lubricant solution according to claim 1, in which the alcohol/ether is selected from the group consisting of lower alkyl mono and di ethers of ethylene glycol and propylene glycol, lower alkyl mono- and diethers of diethylene glycol and dipropylene glycol, and lower alkyl mono and diethers of triethylene glycol and tripropylene glycol and lower alkyl alcohols.

9. An aqueous stable cooling lubricant solution according to claim 1, including in addition a nonionic compound having the formula R₅(B)ₘOR₆, wherein R₅ is selected from the group consisting of hydrocarbon and acyl groups having from about eight to about twenty-four carbon atoms, B is an oxyalkylene group having from two to four carbon atoms, R₆ is selected from the group consisting of hydrogen and alkyl and acyl groups having from one to four carbon atoms, and m is a number (which can be an average number) from 0 to 4.

10. An aqueous stable cooling lubricant solution according to claim 9 in which the nonionic compound has the general formula R₅(B)ₘOH, wherein R₅, B and m have the meanings indicated in claim 9.

11. An aqueous stable cooling lubricant solution according to claim 9 wherein the nonionic compound is selected from the group consisting of water-insoluble alcohols, and oxo alcohols having from nine to seventeen carbon atoms; phenols; and ethoxylates of such alcohols and phenols with from 1 to 4 moles of ethylene oxide per mole of alcohol or phenol.

12. An aqueous stable cooling lubricant solution according to claim 9 in which the nonionic compound is a fatty acid ester which is alkoxylated or esterified with the compound H(B)ₘOR₆, and has the formula R₅(B)ₘOR₆, wherein R₅ is acyl and wherein B, R₆, and m have the meaning indicated in claim 10.

13. An aqueous stable cooling lubricant solution according to claim 1 having the following formulations:

| Component | % by Weight |
|---|---|
| Carboxylic acid | 15 to 75 |
| Tertiary alkylalkanolamine | 3 to 60 |
| Alcohol/ether | 10 to 87 |
| Nonionic compound | 0 to 30 |
| Additives: | |
| bactericidal agents, perfumes, viscosity controlling agents etc. | 0 to 30 |
| Water | 0 to 82 |

14. An aqueous stable cooling lubricant solution according to claim 1 having the following formulations:

| Component | % by Weight |
|---|---|
| Carboxylic acid | 20 to 45 |
| Tertiary alkylalkanolamine | 10 to 45 |
| Alcohol/ether | 10 to 68 |
| Nonionic compound | 2 to 30 |
| Additives: | |
| bactericidal agents, perfumes, viscosity controlling agents etc. | 0 to 15 |

-continued

| Component | % by Weight |
|---|---|
| Water | 0 to 58 |

15. An aqueous stable cooling lubricant solution according to claim 1 having the following formulations:

| Component | % by Weight |
|---|---|
| Carboxylic acid | 0.5 to 25 |
| Tertiary alkylalkanolamine | 0.1 to 20 |
| Alcohol/ether | 0.5 to 33 |
| Nonionic compound | 0 to 10 |
| Additives: | |
| bactericidal agents, perfumes, viscosity controlling agents | 0 to 5 |
| Water | 25 to 99.4 |

16. An aqueous stable cooling lubricant solution according to claim 1 having the following formulations:

| Component | % by Weight |
|---|---|
| Carboxylic acid | 2 to 15 |
| Tertiary alkylalkanolamine | 1 to 15 |

-continued

| Component | % by Weight |
|---|---|
| Alcohol/ether | 1 to 18 |
| Nonionic compound | 0.1 to 2 |
| Additives: | |
| bactericidal agents, perfumes, viscosity controlling agents | 0.1 to 2 |
| Water | 40 to 96.7 |

17. A process for the mechanical working of aluminum and aluminum alloys, which comprises mechanically working the aluminum or aluminum alloy in the presence of an aqueous stable cooling lubricant solution according to claim 1.

18. A process according to claim 17, in which the mechanical working is rolling at a temperature within the range from about 20 to about 70° C.

19. A process for the mechanical working of aluminum and aluminum alloys, which comprises mechanically working the aluminum or aluminum alloy in the presence of an aqueous stable cooling lubricant solution according to claim 13.

20. A process for the mechanical working of aluminum and aluminum alloys, which comprises mechanically working the aluminum or aluminum alloy in the presence of an aqueous stable cooling lubricant solution according to claim 15.

* * * * *